United States Patent [19]

Richards et al.

[11] 3,845,303

[45] Oct. 29, 1974

[54] METHOD AND APPARATUS TO DETERMINE ACTIVITIES OF A NATURAL AQUATIC POPULATION OF MICROSCOPIC ORGANISMS

[76] Inventors: Russell L. Richards, 450 Portlock Rd., Honolulu, Hawaii 98625; Kaare R. Gundersen, 3662 Woodlawn Ter., Honolulu, Hawaii 96822

[21] Appl. No.: 354,137

[52] U.S. Cl. ............................... 250/303, 250/304
[51] Int. Cl. ............................................ G21h 5/02
[58] Field of Search ........... 250/255, 302, 303, 356, 250/357, 304; 356/36

[56] References Cited
UNITED STATES PATENTS

| | | | |
|---|---|---|---|
| 2,599,975 | 6/1952 | Carpenter | 250/356 X |
| 3,023,310 | 2/1962 | Maxwell | 250/255 |
| 3,209,145 | 9/1965 | McGrath | 250/356 |

*Primary Examiner*—Archie R. Borchelt
*Attorney, Agent, or Firm*—Michael S. Striker

[57] ABSTRACT

A method and apparatus to determine biological activities of a natural aquatic population of microscopic organisms in which at least one container open at opposite ends is sunk in upright condition to a predetermined depth into a natural body of water, whereafter the opposite ends of the container are fluid-tightly closed so as to trap part of the water with the microscopic organisms contained therein in the container. A chemical is discharged into the water trapped in the container and the latter with its trapped contents is maintained for a predetermined time at the chosen depth. Subsequently, the container is raised and the contents thereof are discharged for analysis.

22 Claims, 4 Drawing Figures

METHOD AND APPARATUS TO DETERMINE ACTIVITIES OF A NATURAL AQUATIC POPULATION OF MICROSCOPIC ORGANISMS

BACKGROUND OF THE INVENTION

Phytoplankton, like other organisms, respond to many variables in their environment. Changes may be stimulatory, such as added nutrients, or harmful, such as a sudden exposure to high light intensities. In any stable environment, each successful member of the biological community tends to occupy a niche in which, at any given time, the combined physical, chemical and biological parameters are optimal. Sudden changes induced in such a stable ecosystem may have unpredictable effects on its biological structure and function. The experimental ecologist, including the student of primary production, is certainly aware of these problems and is continuously faced with the technical difficulties of observing without disturbing. Sources of error and limitations of the standard carbon-14 technique now used universally in aquatic photosynthetic productivity work have been discussed in detail by many workers.

It is well established that phytoplankton may readily become damaged when suddenly exposed to high light intensities or spectral ranges, particularly to ultraviolet and far red light, not existing at depth. Such damage may occur when a water sample is transferred to the surface and particularly during filling of the BOD bottles prior to incubation. In addition, changes in temperature and hydrostatic pressure of the water sample may directly or indirectly disrupt the existing equilibrium of the microecosystem with unpredictable results. Moreover, the mere physical handling of water samples are known to be harmful to many delicate, soft-bodied ultra-plankters, particularly in tropical waters.

These various hazards are unavoidable in the currently used technique for primary production determination in water bodies. In spite of the general recognition of these short-comings, few seem to have attempted to improve on the technique.

Recently a fully automated, submersible instrument which not only will inject a carbon-14 solution into the water sample in sito but also filter and preserve the plankton at depths following incubation has been described by Levin and Lindgren (Automatic Primary Productivity Instrument; proceedings 7th Annular Maritime Technical Society Conference 1971), however, the instrument disclosed is extremely complicated so that its cost would be prohibitive for its general use in productivity work.

SUMMARY OF THE INVENTION

It is an object of the present invention to provide for a method and apparatus to determine biological activities of a natural aquatic population of microscopic organisms in situ.

It is a further object of the present invention to provide for such an apparatus which is relatively simple in construction so it can be manufactured at reasonable cost and will stand up properly under extended use.

With these objects in view, the apparatus according to the present invention mainly comprises a frame, at least one container mounted on the frame and having opposite ends and closure means at the opposite ends movable between an open and a closed position fluid-tightly closing the opposite ends of the container. The apparatus further includes biasing means for urging the closure means to the closed position and releasable latching means for holding the closure means against the force of the biasing means in open position. Suspension means are further provided for suspending the frame and the container mounted thereon in upright position at selected depths in a body of water, and means for releasing the latching means while the frame is thus suspended at a selected depth so as to move the closure means under the influence of the biasing means to the closed position to thereby trap an amount of water in the container.

Preferable, the apparatus includes two containers mounted on the frame, in which one of the containers and the closure means thereof are formed from transparent material and the other container and its closure means are formed from opaque material so that the influence of light on the trapped contents may be studied.

The apparatus further includes preferably means for discharging a chemical into each of the containers substantially at the moment in which the closure means closes the container.

The method according to the present invention comprises the steps of sinking the above-mentioned apparatus with the container open at opposite ends and in upright condition to a predetermined depth in a natural body of water, subsequently fluid-tightly closing the opposite ends of the container at the predetermined depth so as to trap the water therein, discharging a chemical into the water trapped in the container, maintaining the closed container with the contents therein for a predetermined time at the selected depth, raising thereafter the closed container from the body of water, and discharging the contents thereof for analysis. The chemical to be discharged into the trapped water in the container may be a radio-active substance, for instance C-14 carbonate.

DESCRIPTION OF THE PREFERRED EMBODIMENTS

Figure 1:
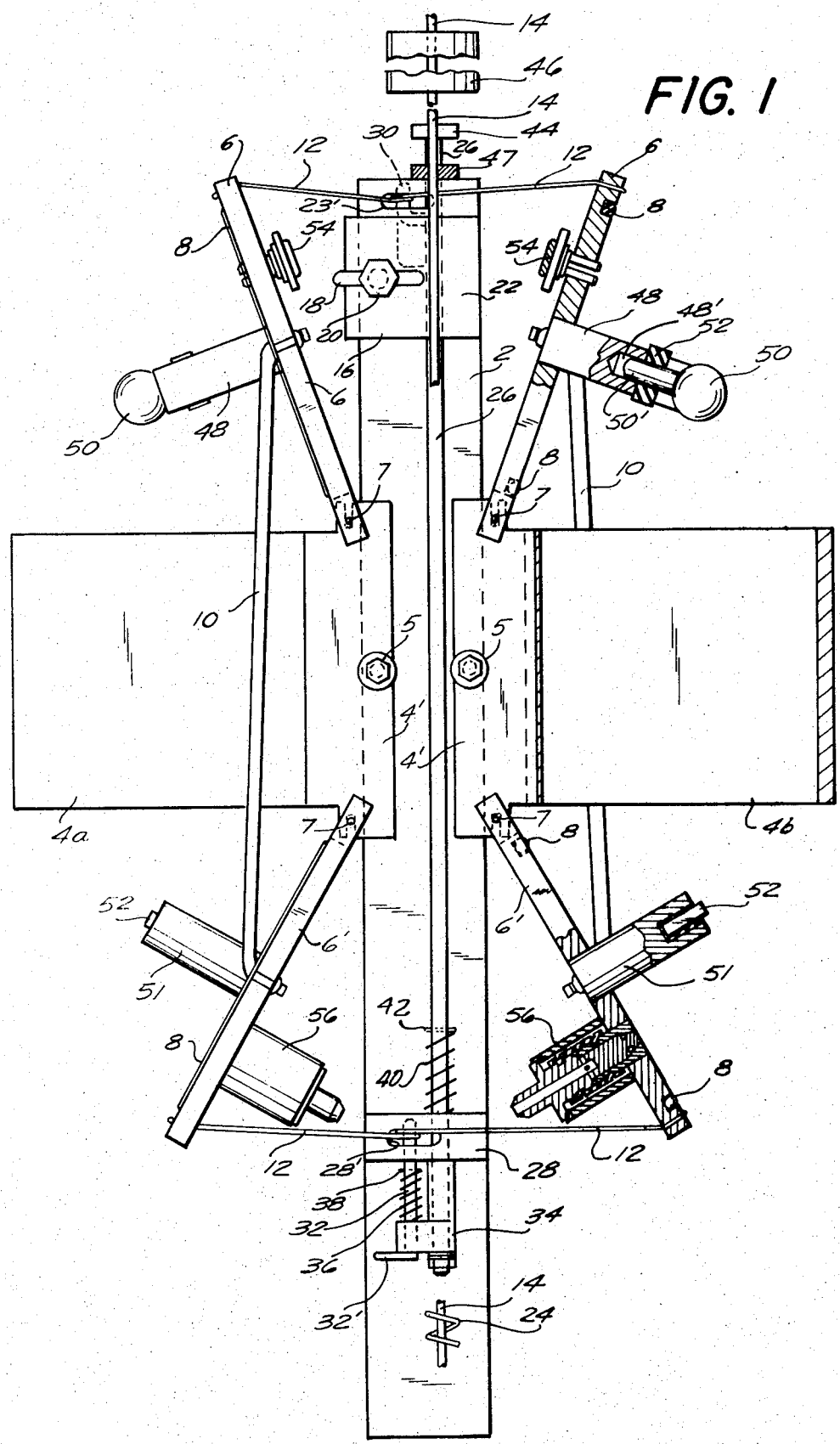
FIG. 1 is a partially sectioned side view of the apparatus of the present invention and illustrates the containers in open condition.
Figure 2:
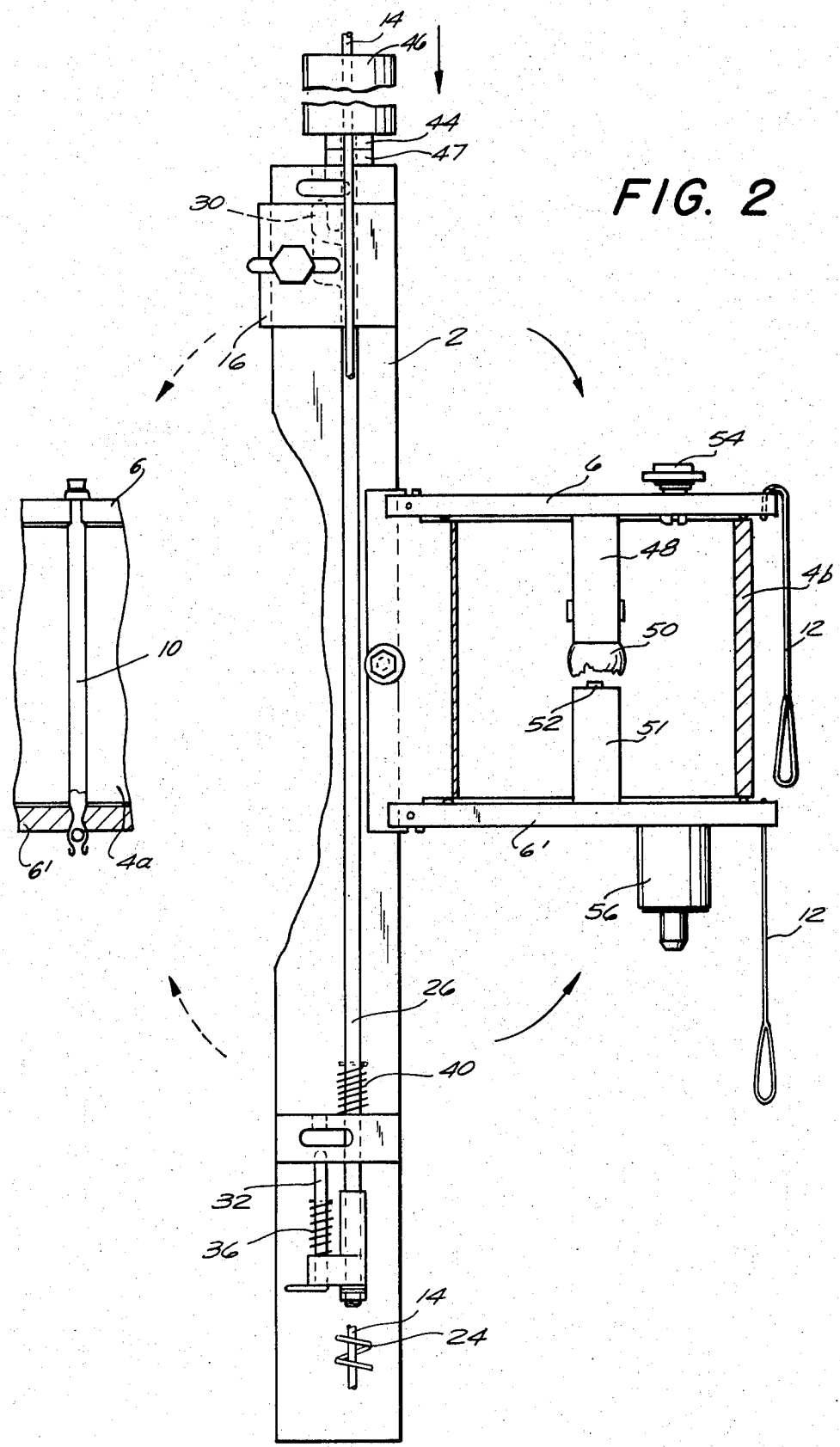
FIG. 2 is a partially sectioned side view similar to FIG. 1 showing the containers in closed condition.
Figure 3:
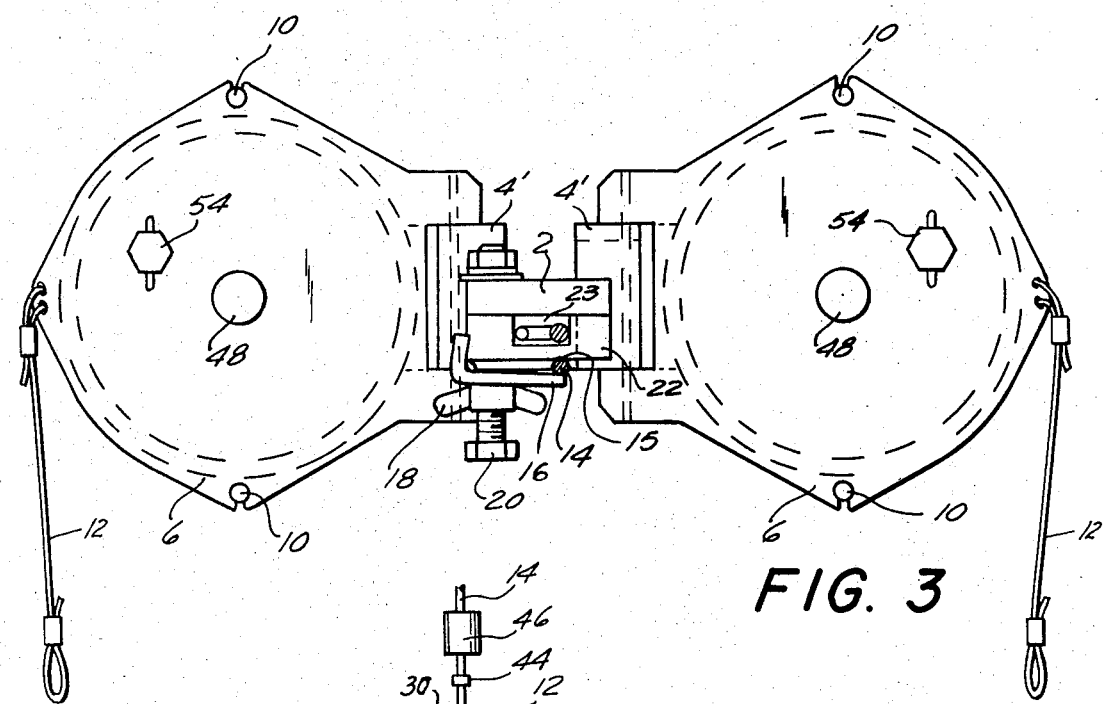
FIG. 3 is a top view of the apparatus as shown in FIG. 2.

Referring now to the drawing, and more specifically to FIG. 1 of the same, it will be seen that the apparatus according to the present invention may comprise a frame 2 formed mainly by an elongated bar of plastic material, for instance polycarbonate, to which, intermediate the opposite ends of the bar, two substantially cylindrical containers 4a and 4b are releasably attached by means of screws and nuts 5 extending through appropriate bores in the frame 2 and ears 4' on the facing sides of the containers which partly encompass the bar 2, as best shown in FIG. 3. One of the containers, for instance the container 4a, is preferably formed from clear polycarbonate plastic, whereas the other container, that is the container 4b, is preferably formed from opaque, dark colored polyvinyl chloride. The volume of each container is preferably one liter ± 1 percent. The containers 4a and 4b have opposite open ends which are closable by closure means shown as lids 6 and 6'. The lids 6 and 6' for each container are formed from the same material as the respective container, that is the lids 6 and 6' for the container 4a are formed from clear polycarbonate, whereas the lids for the container 4b are formed from opaque, dark colored polyvinyl chloride. The lids 6 and 6' are respectively mounted at the open ends of the containers tiltable about pivot pins 7 between an open position, as shown in FIG. 1, and a fluid-tightly closed position, as shown in FIG. 2. The pivot pins 7 are preferably of stainless steel and arranged in appropriate slots at the container ends. Biasing means 10 are provided for biasing the lids 6 and 6' to the closed position, and the biasing means for each container comprise preferably a pair of elastic straps 10 made of surgical rubber tubing and extending with opposite ends through appropriate slots in the respective lid, as shown in FIG. 3, and the opposite ends are held at the outer surface of each lid in any desired, but preferably releasable manner.

In order to hold the lids 6 and 6', during submersion of the apparatus into a body of water, in open condition against the force of the biasing means 10, each of the lids is provided with a looped strap 12, preferably formed from stainless steel, and connected to the respective lid at the end thereof opposite the hinged end. The looped end of each strap 12 is, during submersion of the apparatus in a body of water, releasably held onto the frame 2 in a manner as will now be described.

The whole apparatus is suspended on a 3/16 hydrographic cable 14 clamped to the upper end of the frame 2 by clamping means, best shown in FIG. 3, and comprising an L-shaped member 16, preferably of stainless steel, engaged by a wing nut 18 on a screw 20 so that a cable portion may be pressed into a V-shaped groove 15 formed in a block 22 of plastic material which is fastened, in any suitable manner, for instance by cementing, in the region of the upper end of the frame 2 to the latter. The lower end portion of the cable 14 passes through an open spiral guide 24 connected in any suitable manner to the lower end of the frame 2. The looped ends of the straps 12 are held during lowering of the apparatus, in which the lids 6 and 6' are held in open position, by releasable latching means which comprise an elongated rod 26 extending longitudinally in front of the frame 2 and being guided for movement in longitudinal direction in a cutout 23 in the aforementioned block 22 and in the region of its lower end in a corresponding cutout provided in a lower block 28 likewise fastened to the front face of the frame 2 by cementing or in any other convenient manner. A hook portion 30 is integrally connected with an upper portion of the rod 26 and located in the aforementioned cutout 23 in the block 22 and the looped ends of the straps 12 of the upper lids 6 are engaged, through lateral cutouts 23' in the block 22, with the hook portion 30. The looped ends of the lower straps 12 connected to the lids 6' are releasably held by the upper end of an L-shaped hook 32 which, however, is preferably not integrally formed with the rod 26 but movable with respect thereto. The hook 32 is guided for longitudinal movement relative to the rod 26 in an appropriate cutout of the aforementioned block 28 and in a bore of a block 34 connected to the lower end of the rod in any suitable manner. A coil compression spring 36 abutting with its lower end on the upper surface of the block 34 and with its upper end against a pin 38 extending through an appropriate bore transversely through the member 32 yieldably maintains the latter in the position as shown in FIG. 1, while the transversely bent lower end 32' abuts against the lower face of the block 34. By pulling downwardly on the portion 32' projecting laterally beyond the block 34, the lower hook 32 may be lowereed so that the looped ends of the straps 12 may be engaged with the upper end of the hook 32 through lateral cutouts 28' formed in the block 28. The rod 26 is yieldably held in the position as shown in FIG. 1 by a light coil compression spring 40 wound about a lower portion of the rod and abutting with its lower end against the upper surface of the block 28 and with its upper end against a pin 42 extending transversely through a bore in the rod 26. The rod 26 carries at its upper end an enlarged abutment portion 44.

In view of the above described construction it is possible to engage the looped ends of the straps 12 with the hooks 30 and 32 independently from each other. In other words, the two upper lids 6 may be first moved to the open position by engaging their straps with the hook 32 and then the lower lids 6' moved to the open position and their straps engaged with the hook 32 which is movable independently from the hook 30. On the other hand, each of the lids can be moved independently to the open position by first removing one end of each biasing straps 10 through the slots in the lids 6 or 6' and re-engaging the straps 10 with the lid only after the lids have been secured in the open position by engagement of the straps 12 with the hooks 30 and 32.

In order to move the rod 26 in downward direction against the force of the light compression spring 40, a weight 46 is slidably guided on the cable 14 so that, when the weight is released for downward movement on the cable, the lower surface of the weight will impact onto the abutment member 44 connected to the upper end of the rod 26 to move the latter against the force of the light compression spring 40 in downward direction so that the looped ends of the straps 12 will become disengaged from the hooks 30 and 32 and the lids 6 and 6' will thereupon move to the closed position, as shown in FIG. 2, under the influence of the biasing means 10. In order to provide for a fluid-tight closure for the containers 4a and 4b, each of the lids is provided with an annular sealing ring 8 adapted to engage in the closed position of the containers, respectively, the upper and lower edges thereof.

The weight 46 constitutes means for releasing the latching means constituted by the rod 26, the hooks 30 and 32 connected thereto and the straps 12.

In order to dampen the impact of the member 44 onto the upper face of the frame 2, a rubber washer 47 through which the rod 26 extends is preferably provided on the upper face of the frame 2.

In order to discharge a chemical into each of the containers 4a and 4b substantially at the moment the lids 6 and 6' close the respective container, a central post 48 is connected in any suitable manner to each of the upper lids 6 projecting from the inner face thereof and formed at its free end with the bore 48' extending thereinto. The posts 48 are preferably formed from the same material as the respective lids. The stem 50' of a glass ampule 50 is located in the bore 48' of each post and releasably held therein by a rubber tubing 52. The spherical portion of each ampule has preferably a diameter of 16 mm. and a wall thickness of 1/10 mm. The ampule is preferably formed from pyrex glass. For work in shallow water, up to a depth of maximum 50 meters, or about 150 feet, the stem 50' of the ampule may be sealed by melting the glass in a burner, whereas for work in a body of water of greater depth in which the hydrostatic pressure exerted on the bulb will exceed 5 atm., the stem of the ampule is sealed by melting a plug of paraffin wax. 1 ml. of carbon-14 labelled sodium carbonate in 5% NaCl carrier solution is used with the ampule type described. Various tests shows that an activity of 5 or 10 uc (microcuries) of carbon-14 was suitable for use in moderately productive waters (fixation rates 5–15 mg. $C/m^3/hr$) and in the oligotrophic type of oceanic water found off the Hawaiian Islands (fixation rates smaller than 1 mg. $C/m^3/hr$) 100 uc gave reasonable results.

Each of the lower lids 6' is provided with a central post 51 connected thereto in any suitable manner and preferably formed from the same material as the respective lid. Each post 51 is provided with a central bore into which a glass rod 52 is cemented projecting with its end slightly beyond the free end of the post 51.

Each of the upper lids 6 is further preferably provided in an off-center position with an air vent 54 of known construction, and each of the lower lids 6' is preferably provided in an off-center position with a push-pull type draining valve 56 of known construction for discharging the contents from the closed containers.

Figure 4:
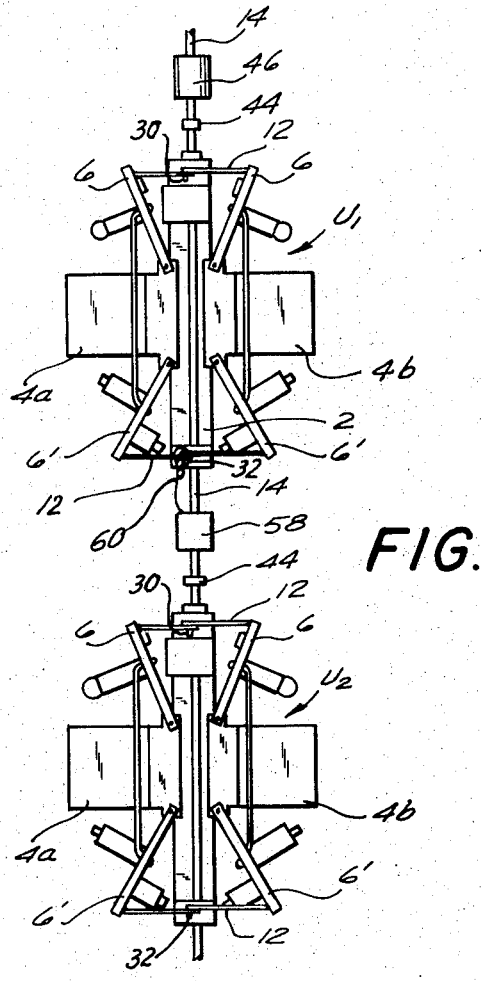
FIG. 4 is a side view of a modified apparatus showing two pairs of containers and an arrangement for sequentially closing the pair of containers.

Two or more units as described in connection with FIGS. 1–3 may be attached vertically spaced from each other to the cable 14 and such an arrangement is shown in FIG. 4 at a reduced scale. As shown therein, two units $U_1$ and $U_2$ are attached to the cable 14, spaced in longitudinal direction of the cable, by the above-described clamping means 16, 18 and 20, not shown in detail in FIG. 4. In FIG. 4 these two units are shown closely adjacent each other, but in actuality these units may be spaced a considerable distance from each other. FIG. 4 shows the containers 4a and 4b of each unit in open condition, and the lids 6 and 6' of the upper unit $U_1$ may be moved to the closed position by the impact of the weight 46 onto the abutment member 44 at the upper end of the rod 26 in the manner as described above. An additional weight 58 is held closely adjacent the lower end of the upper unit $U_1$ on the cable 14 by a flexible cable 60 connected at its lower end to the weight 58 and having an upper looped end engaged around the hook 32 of the upper unit. When the straps 12 of the upper unit are released from the hooks on the rod 26, only in part shown in FIG. 4, in the manner as described above, the cable 60 will also be released so as to release the lower weight 58 for sliding movement along the cable 14 for impact onto the abutment member 44 of the lower unit $U_2$ so that the straps 12 of the lower unit $U_2$ will likewise be released and the lids 6 and 6' of the lower unit $U_2$ will close subsequently to the closing of the lids of the upper unit $U_1$.

While FIG. 4 shows only two units attached to the same cable, it is understood that a plurality of such units can be attached spaced in longitudinal direction of the cable 14 to the latter at any selected distance from each other and in this case an additional weight 58 is provided between each pair of successive units.

The operation of the above-described apparatus will be obvious from the description thereof. The unit as shown in FIG. 1–3, or a plurality of units as shown in FIG. 4, are suspended on the cable 14 to a predetermined depth with the lids for all containers in open position, as shown in FIG. 1. After the unit is thus submerged in a body of water to the desired depth, the weight 46 is released to slide down on the cable 14 and to impinge with a considerable impact on the abutment member 44 on the upper end of the rod 26 to move the latter against the force of the light compression spring 40 in downward direction, thereby releasing the looped ends of the straps 12 from the hooks 30 and 32 so that the lids 6 and 6' will simultaneously move from the open position, as shown in FIG. 1, to the closed position, as shown in FIG. 2, thereby fluid-tightly closing the containers 4a and 4b at the opposite ends. When the containers are almost closed, the glass rods 52 on the posts 51 on the lower lids 6' will hit the spherical portion of the ampules 50 on the posts 48 on the upper lids 6 and shatter the glass whereby the ampule content, helped by the turbulence created by the closing lids, will rapidly mix with the entrapped water sample. After an incubation period of predetermined time, which may last for several hours, the unit or units are hauled to the surface and some samples are withdrawn for analysis. This may be done by opening the draining valve and the air vent so that fluid will flow out from the container and the flow rate may be controlled by adjusting the air vent. A second method of sampling is by unscrewing the air vent and withdrawing water by means of a syringe. If two or more units are used on the same cable, as shown in FIG. 4, water samples may be taken simultaneously from different depths of the body of water.

The decontamination of radioactive materials without spilling and subsequent cleaning can be easily done by removing each container from the frame 2 and soaking the container individually in acid cleansing solution. In this process, the rubber straps 10 are snapped loose from the lids and the broken ampule and glass splinters are removed by forceps. Since all containers are of standard size and releasably connected to the frame 2, it is also possible to make up the units from two containers each formed from clear polycarbonate plastic or each formed from opaque dark colored polyvinyl chloride instead of the standard unit which contains, as described above, a clear transparent container and a dark colored opaque container. This will permit the determination of reproducability of experimental results and will render information on homogeneity or patchiness in the water column and open up a variety of other experimental possibilities.

Instead of using the glass rod ampule breaker 52 on the lower lid, a second ampule may also be inserted instead thereof in the bore of the post 51 on the lower lid. In this case both ampules will break on impact against each other and by supplying different substances in the two ampules, a multiple of variations in experimental design is possible. Evidently, the ampules may be filled also with a different material then that described above, and ampules may be supplied which are filled with all kinds of chemical substances which can be acted upon biologically or which act to modify the physical-chemical state of the entrapped water (pH changes, salinity, alkalinity, etc.). In this way considerable information on in situ effects of interest, for example, in water polution research and control, is possible.

It should also be mentioned that ampules may also contain a volume of gas or even a suspension of a pure culture of a microorganism whose survival or activity under true in situ condition through a predetermined period is of interest.

By closing the containers of each unit at one water depth and by subsequently either lowering it further or holding it closer to the surface in closed position, it is possible to investigate the effects of a different light intensity, temperature, or hydrostatic pressure on a given population of organisms. This technique has been used by the inventors in studying the origin of the ocean primary nitrite-band to show that the nitrite was produced from nitrate by phytophankton at low light intensitites.

The volume of water in each container is sufficiently large to permit sub-sampling for chemical analysis, pH and alkalinity, pigment determination, and microscopy in addition to the productivity determination, at least in eutrophicated water. When radioactive materials are used, such accessory sampling must of course comply with regulations of the Atomic Energy Commission for handling of radioactive materials, and this is only recommended for experienced laboratories.

Evidently it is also possible to use units disclosed without ampules, as a regular water sampler.

It will be understood that each of the elements described above, or two or more together, may also find a useful application in other types of method and apparatus to determine biological activities of a natural aquatic population of microscopic organisms differing from the types described above.

While the invention has been illustrated and described as embodied in the method and apparatus to determine biological activities of a natural aquatic population of microscopic organism in situ and in a predetermined depth in a body of water, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. An apparatus of the character described, comprising, in combination, a frame; at least one container mounted on said frame and having opposite open ends and closure means at said open ends movable between an open and a closed position fluid-tightly closing said opposite ends of said container; biasing means for urging said closure means to said closed position; releasable latching means for holding said closure means against the force of said biasing means in open position; suspension means for suspending said frame and the container mounted thereon in upright position at selected depths in a body of water; and means for releasing said latching means while said frame is thus suspended at a selected depth so as to move said closure means under the influence of said biasing means to said closed position to thereby trap an amount of water in said container.

2. An apparatus as defined in claim 1, wherein said closure means comprise a pair of lids hingedly mounted on said container for tilting movement about respective tilting axes between said open and said closed positions.

3. An apparatus as defined in claim 2, wherein said biasing means comprise resilient means removably connected at opposite ends to said lids spaced from said tilting axes.

4. Apparatus as defined in claim 2, wherein said frame comprises an elongated member extending with opposite end portions beyond said opposite ends of said container, and wherein said releasable latching means comprises a rod mounted on said elongated member for movement in longitudinal direction thereof between a holding and a releasing position, hook means connected to said rod for movement therewith between said positions thereof and means for connecting said lids to said hook means when said rod is in said holding position and for releasing said lids for movement to said closed position upon movement of said rod to said releasing position.

5. Apparatus as defined in claim 4, and including rod biasing means for yieldably holding said rod in said holding position.

6. Apparatus as defined in claim 4, wherein one of said hook means on said rod is connected to said rod movable with respect thereto.

7. Apparatus as defined in claim 5, wherein said means for releasing said latching means comprises a weight movably mounted on said suspension means for impact on said rod for moving the latter against said rod biasing means to said releasing position.

8. Apparatus as defined in claim 7, wherein said suspension means comprises a cable and including clamping means for releasably clamping said cable to said elongated member, said weight being slidable along said cable.

9. Apparatus as defined in claim 1, and including means for discharging a chemical into said container substantially at the moment at which closure means close the opposite ends of the latter.

10. Apparatus as defined in claim 9, wherein said chemical discharging means comprises a frangible receptacle enclosing said chemical and means for breaking said frangible receptacle for discharge of the chemical therein into said container substantially at the moment at which said closure means close the opposite ends of said container.

11. Apparatus as defined in claim 2, wherein each of said lids has an inner face facing in the closed position of said lids the interior of said container, and including mounting means projecting from the inner face of one of said lids for releasably mounting thereon a frangible receptacle containing a chemical, and means projecting from the inner face of the other of said lids for breaking said receptacle substantially at the moment at which said lids close the opposite ends of said container.

12. Apparatus as defined in claim 2, and including an air vent on the upper of said lids and a draining valve on the lower of said lids.

13. Apparatus as defined in claim 2, wherein said container has a cylindrical peripheral wall having opposite end edges, and including sealing rings on both lids engaging said end edges at the closed position of said lids.

14. Apparatus as defined in claim 1, and including a second container mounted on said frame opposite the first-mentioned container, said second container having likewise opposite open ends and closure means at said open ends movable between an open and a closed position fluid-tightly closing said opposite ends of said second container and biasing means for urging said closure means of said second container to said closed position, said releasable latching means cooperating with the closure means of both containers.

15. Apparatus as defined in claim 14, wherein one of said containers and the closure means thereof are formed from transparent material and the other containers and the closure means thereof are formed from opaque material.

16. Apparatus as defined in claim 15, wherein said one container and its closure means are formed from clear plastics material such as polycarbonate or acrylic and the other container and its closure means are formed from opaque, dark colored plastics material such as polyvinyl chloride or acrylic.

17. Apparatus as defined in claim 14, and including mounting means for releasably mounting each of said containers to said frame, so that said containers with a water sample enclosed thereto may be removed from said frame without disturbing the water sample.

18. Apparatus as defined in claim 14, and including means for discharging a chemical into each of said containers substantially at the moment at which the closure means close said containers.

19. Apparatus as defined in claim 14, and including a second frame mounted on said suspension means displaced in longitudinal direction of the latter from said one frame, said second frame carrying likewise a pair of containers provided with closure means, biasing means and releasable latching means, and further including means for releasing the latching means for the containers on said second frame, and means for actuating the last-mentioned releasing means automatically upon movement of the closure means of the containers on said one frame to said closed position.

20. A method of determining biological activity of a natural aquatic population of microscopic organisms in a body of water comprising the steps of sinking two containers open at opposite ends in upright condition to the same predetermined depth into a natural body of water; fluid-tightly closing the opposite ends of said containers at said predetermined depth so as to trap the water therein; discharging a chemical into the water trapped in said containers; maintaining the closed containers with the contents therein for a predetermined time at said predetermined depth while subjecting the contents of one of said containers to the influence of light in the body of water at said predetermined depth and preventing penetration of light into the interior of the other container; raising thereafter the closed containers from the body of water and discharging the contents thereof for analysis.

21. A method as defined in claim 20, wherein said chemical comprises a radioactive substance.

22. A method as defined in claim 20, wherein said chemical comprises radioactive C-14 carbonate.

* * * * *